Figure 1:
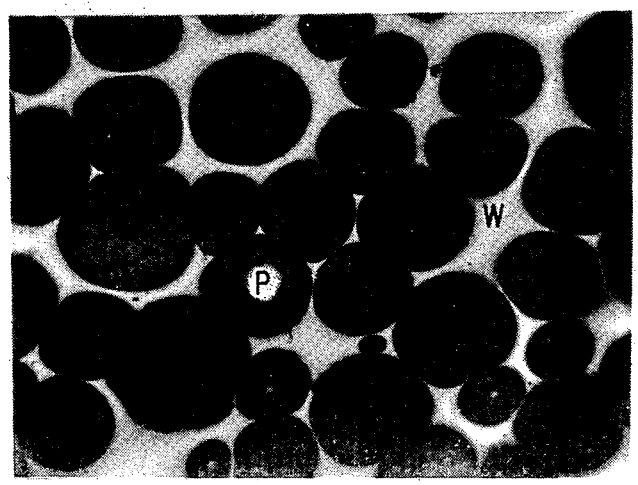

INVENTORS
EDGAR R. McHENRY
ERVIN L. PIPER
ATTORNEY 3,387,940
HIGH-STRENGTH CARBON FOAM
Edgar R. McHenry, Lawrenceburg, Tenn., and Ervin L. Piper, Fostoria, Ohio, assignors to Union Carbide Corporation, a corporation of New York
Filed Aug. 29, 1963, Ser. No. 305,495
11 Claims. (Cl. 23—209.2)

This invention relates to foamed articles. More particularly, this invention relates to relatively high-strength porous carbon articles and methods for making the same.

Porous carbon bodies such as coke and various charcoals are widely used in industrial applications such as filter beds, catalyst supports, diffusers, aerators, gas absorbers, scrubbers, and the like. Such carbon bodies are produced by the destructive distillation of naturally occurring carbonaceous materials since all such materials give up a substantial amount of their volatile matter when heated in an atmosphere having a limited amount of oxygen, for example, in a closed retort. The residue after distillation is coke or charcoal. Commonly produced are charcoals of wood, bone, leather, rice hulls, and the like.

When such carbonaceous materials are distilled the resulting product substantially retains the carbon skeleton of the material from which the volatile constituents have been driven off with or without decomposition. Charcoals of wood, bone, ivory, etc. all retain, in miniature, the grain and structure of the parent material.

Porous carbon bodies produced in the aforedescribed manner have serious shortcomings, however. Such bodies have quite erratic and unpredictable physical properties, are readily ignited at relatively low temperatures, and continue to burn once ignited. Other such bodies have a relatively high bulk density and are poor thermal insulants.

Synthetic carbon foam materials, while overcoming the above-mentioned shortcomings and while suitable as thermal insulators in most applications, lack sufficient mechanical strength for use as an insulating material in instances where an insulated object is subjected to abuse such as internal and external stresses, impacts, abrasions, and the like.

It is an object of the present invention to provide a synthetic carbon foam article having superior mechanical strength.

It is another object to provide novel methods for making relatively high strength synthetic carbon foam.

It is a further object to provide methods for making relatively high strength synthetic graphite foams.

Other objects will become readily apparent to one skilled in the art upon reference to the ensuing discussion and the drawing in which—

Figure 2:
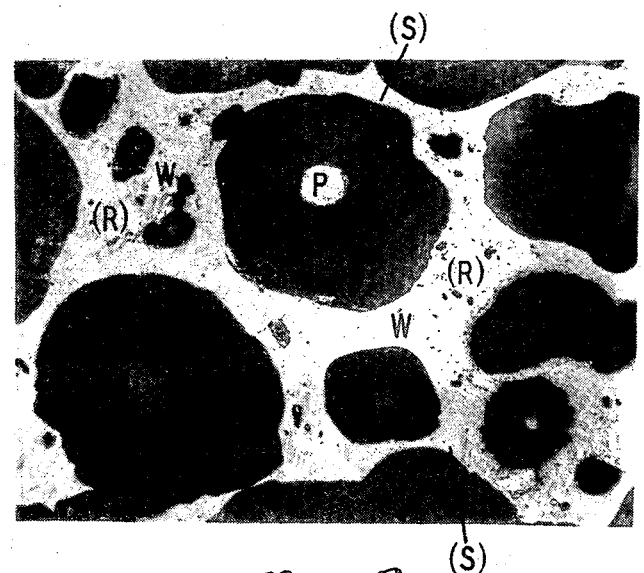

FIG. 1 is a photomicrograph showing the grain structure of a carbonized polyurethane foam section containing no carbonaceous filler and magnified 230 times, and FIG. 2 is a photomicrograph showing the grain structure of a carbonized polyurethane foam containing a carbonaceous filler and magnified 230 times.

The foregoing objects are achieved by a synthetic carbon foam which is derived from a rigid, polyester-type polyurethane foam containing a finely divided carbonaceous filler. The resulting foam is characterized by an increasing permeability with increasing bulk density and a relatively larger pore size as compared to a carbon foam obtained from rigid polyester-type polyurethane foam containing no filler. Moreover, the instant carbon foam is about twice as strong.

Thus the instant carbon foam is particularly well suited in high-temperature insulating applications, as a catalyst carrier, and other similar applications.

The carbon foam is produced by subjecting a rigid polyurethane foam of the polyester type which contains a finely divided carbonaceous filler to a specific heat treatment which comprises a curing step, an oxidizing step, and a pyrolyzing step. If a graphitic foam is desired as the final product, the carbon foam obtained after the pyrolyzing step is further subjected to a graphitizing treatment.

The curing step comprises maintaining the polyurethane foam at an elevated temperature up to about 200° C. and in an oxygen-containing atomsphere for a sufficient time period to increase the degree of cross-linking of the polymers present in the foam. Moreover, unreacted constituents are eliminated from the foam at this time.

The curing time is dependent on the particular polyurethane foam employed, the curing temperature, the degree of cross-linking present in the foam prior to curing, etc. The curing time can range from about 2 hours to about 64 hours. A preferred curing time ranges from about 8 hours to about 24 hours at a curing temperature in the range from about 150° C., to about 200° C.

The oxidizing step comprises maintaining the foam at a temperature in the range from about 200° C. to about 255° C. and in an oxygen-containing atmosphere for a sufficient time period to bring about a weight loss of the foam of at least about 3.5 percent. During this step some oxidation of the foam structure is believed to take place.

It is important that the temperature is maintained within the aforesaid limits since otherwise the foam fuses, collapses, and becomes distorted. A preferred temperature range for the oxidation step is from about 220° C. to about 240° C. However, if carbon foam having a very high surface area is desired, the preferred temperature for the oxidation step is about 250° C. It has been found that surface areas of the order of 100 to 400 m.$^2$/gram can be obtained by subjecting the polyester-type polyurethane foam having a nominal density in the range from about 5 to about 20 lbs./cm. ft. to a temperature of about 250° C. for about 24 hours during the oxidation step.

Also, while a foam weight loss of about 3.5 weight percent is sufficient to yield a satisfactory final product, a weight loss in the range from about 5 weight percent to about 40 weight percent is preferred.

The pyrolyzing step comprises maintaining the foam, which previously has been subjected to the aforedescribed curing and oxidizing steps, at a temperature in the range from about 500° C. to about 1000° C. for a sufficient time period to produce a homogeneous, porous matrix consisting substantially of carbon. The pyrolyzing step is carried out in an oxygen-free atmosphere, such as a vacuum or an inert gas atmosphere comprising nitrogen, argon, krypton, xenon, helium, and the like. The pyrolyzing temeperature is dependent on the particular polyurethane foam employed, the degree of foam shrinkage desired, and the desired physical properties of the final product. As a general rule, the pyrolyzing temperature should exceed the temperature at which the resultant product is to be used. A pyrolyzing temperature at which the foam is at incandescense, i.e., about 900° C., generally is preferred.

The graphitization heat treatment is carried out at a temperature above about 2200° C. and in an oxygen-free atmosphere. A graphitization temperature in the range from about 2800° C. to about 3000° C. is preferred. The temperature and the duration of the graphitization treatment are dependent on the degree of graphitization desired and also on the physical size of the carbon foam piece being graphitized. The time period at the aforesaid temperatures can be as short as five minutes and as long as eight hours. In most instances a time period of about thirty minutes is sufficient for complete graphitization.

Rigid polyurethane foams suitable for use with the present invention are those of the polyester type. These foams can be prepared by reacting a polyester with an organic polyisocyanate.

Polyesters that are suitable reactants with the polyisocyanates are those having reactive hydrogen-containing terminal groups, preferably predominantly hydroxyl groups. The hydroxyl number of the polyester is in the range from about 100 to about 600. Preferably the hydroxyl number is above about 150. Most preferred polyesters for the purposes of the present invention are those having a hydroxyl number in the range from about 150 to about 500.

The hydroxyl number is a measure of and is proportional to the hydroxyl concentration per unit weight of polyester. The hydroxyl number is defined in terms of milligrams of KOH equivalent per gram of polyester and is determined by reacting acetic anhydride (in pyridine solution) at refluxing temperature with the hydroxyl groups of the polyester. The unreacted acetic anhydride and the acetic acid formed are then titrated with aqueous sodium hydroxide using phenolphthalein indicator.

Typical polyesters are propylene glycol, ethylene glycol, glycerol, reaction products of polyols such as aliphatic polyols, i.e., polyethylene glycols, polypropylene glycols, polybutylene glycols, polyoxyethyleneoxybutylene glycols, polyoxypolypropyleneoxybutylene glycols, 1,2,6 - hexanetriol, 1,1,1-trimethylolpropane, and the like, with a polycarboxylic acid such as oxalic acid, succinic acid, maleic acid, adipic acid, sebacic acid, isosebacic acid, phthalic acid, and the like. Other useful polyesters comprise homopolymers of lactones, notably epsilon, caprolactones, started with a reactive hydrogen-containing compound, such as those disclosed in U.S. Patent No. 2,914,556.

A variety of organic polyisocyanates may be employed for reaction with the above-described polyesters to provide suitable rigid urethane foams. Preferred isocyanates are polyisocyanates and polyisothiocyanates of the general formula $$(RNCG)_x$$

wherein G is oxygen or sulfur, $x$ is an integer of two or more and R is an alkylene, substituted alkylene, arylene or substituted arylene radicals, a hydrocarbon, or substituted hydrocarbon containing one or more aryl —NCG bonds and one or more alkyl —NCG bond. R can also include radicals such as —RZR— where Z may be a divalent moiety such as —O—, —O—R—O—, —CO—, —CO$_2$—, —S—, —S—R—S—, —SO$_2$—, etc. Examples of such compounds include hexamethylene diisocyanate, 1,8-diisocyanato-p-methane, xylylene diisocyanates, $$(OCNCH_2CH_2CH_2OCH_2)_2$$

1-methyl - 2,4 - diisocyanatocyclohexane, polymethylene polyphenylisocyanate, phenylene diisocyanates, tolylene diisocyanates, chlorophenylene diisocyanates, diphenylmethane-4,4'-diisocyanates, naphthalene-1,5-diisocyanate, triphenylmethane-4,4',4''-triisocyanate, xylene-α,α' - diisothiocyanate, and isopropylbenzene-α,4-diisocyanate.

Further included are dimers and trimers of isocyanates and diisocyanates and polymeric diisocyanates of the general formulae:

$$(RNCG)_x \text{ and } [(NCG)_x]_y$$

in which $x$ and $y$ are two or more, as well as compounds of the general formula:

$$M(NCG)_x$$

in which $x$ is two or more and M is a monofunctional or polyfunctional atom or group. Examples of this type include ethylphosphonic diisocyanate, $C_2H_5P(O)(NCO)_2$; phenylphosphonic diisocyanate, $C_6H_5P(NCO)_2$; compounds containing a =Si —NCG group, isocyanates derived from sulfonamides $R(SO_2NCO)_x$, and the like.

Also useful are polyisocyanates prepared by phosgenation of aniline/formaldehyde condensation products.

The preparation of rigid polyurethane foams of the polyester type can be carried out by the one-shot or semi-prepolymer techniques, each of which are well known. In the semiprepolymer technique, the polyester reactant is partially extended with excess isocyanate to provide a reaction product containing a high percentage of free isocyanate groups (20 to 35%) which is foamed at a later stage by reaction with additional polyester, catalyst and a blowing agent. In the one-shot technique, all of the reactants are reacted simultaneously with the foaming operation.

The amount of isocyanate employed will depend upon the density of the foam and the amount of cross-linking desired. In general the total —NCO equivalent to total active hydrogen equivalent (i.e., hydroxyl plus water, if water is present) should be such as to provide a ratio of 0.8 to 1.2 equivalents of —NCO per equivalent of active hydrogen, and preferably a ratio of about 1.0 to 1.1 equivalents of —NCO per reactive hydrogen.

Foaming can be accomplished by employing a small amount of water in the reaction mixture (for example, from about 0.5 to 5 weight percent of water, based on total weight of the reaction mixture), or through the use of blowing agents which are vaporized by the exotherm of the isocyanate-reactive hydrogen reaction, or by a combination of the two methods. All of these methods are known in the art. The preferred blowing agents are certain halogen-substituted aliphatic hydrocarbons which have boiling points between about —40° C. and 70° C., and which vaporize at or below the temperature of the foaming mass. The blowing agents include, for example, trichloromonofluoromethane, dichlorodifluoromethane, dichloromonofluoromethane, dichloromethane, trichloromethane, bromotrifluoromethane, chlorodifluoromethane, chloromethane, 1-dichloro-1-fluoroethane, 1-difluoro-1,2, 2-trichloroethane, chloropentafluoroethane, 1-chloro-1-fluoroethane, 1-chloro-2-fluoroethane, 1,1,2-trichloro-1,2, 2 - trifluoroethane, 1,1,1 - trichloro-2,2,2-trifluoroethane, 2-chloro-1,1,1,2,3,3,4,4,4-nonafluorobutane, hexafluorocyclobutene, and octafluorocyclobutane. Other useful blowing agents include low-boiling hydrocarbons such as butane, pentane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating, such as N,N'-dimethyl-N'-dinitrosoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pounds per cubic foot respectively.

Catalysts can be employed in the reaction mixture for accelerating the isocyanate-reactive hydrogen reaction. Such catalysts include a wide variety of compounds such as, for example:

(a) Tertiary amines such as trimethylamine, triethylamine, N-methylmorpholine, N-ethylmorpholine, N,N-dimethylbenzylamine, N,N-dimethylethanolamine, N,N,N', N'-tetramethyl-1,3-butanediamine, triethanolamine, 1,4-diazobicyclo[2.2.2]octane, 1,2,4-trimethylpiperazine, bis(dimethylaminomethyl)amine, and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, anitmony trichloride, bismuth nitrate and chloride, and the like;

(e) Chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bisacetylacetonealkylenediimines, salicylaldehydeimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like;

(f) Alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acid, beta-diketones, and 2-(N, N-dialkylamino)alkanols, such as the well known chelates of titanium obtained by said or equivalent procedures;

(g) Salts of organic acids with a variety of metals such as alkali metals, alkaline earth metals, Al, Sn, Pb, Sb, Mn, Co, Ni, and Cu, including, for example, sodium acetate, potassium laurate, calcium hexanoate, stannous acetate, stannous octoate, stannous oleate, lead octoate, metallic driers such as manganese and cobalt naphthenate, and the like;

(h) Oragnometallic derivatives of tetravalent tin, trivalent and pentavalent As, Sb, and Bi, and metal carbonyls of iron and cobalt. Among the organotin compounds that deserve particularly mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

(i) Tertiary amine oxides such as pyridine-N-oxide, and the like.

The tertiary amines may be used as primary catalysts for accelerating the reactive hydrogen/isocyanate reaction or as secondary catalysts in combination with one or more of the above-noted metal catalysts. Metal catalysts, or combinations of metal catalysts, may also be employed as the accelerating agents, without the use of amines. The tin catalysts are the preferred metal catalysts. The catalysts are employed in small amounts, for example, for about 0.001 percent to about 5 percent, based on weight of the reaction mixture.

Small amounts, e.g., about 0.001% to 5.0% by weight of an emulsifying agent such as a polysiloxane-polyoxyalkylene block copolymer having from about 10 to 80 percent by weight of siloxane polymer and from 90 to 20 percent by weight of alkylene oxide polymer, such as the block copolymer described in U.S. Patents 2,834,748 and 2,917,480, can also be employed in making the foam. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bond, rather than carbon-to-oxygen-to-silicon bonds. These copolymers generally contain from 5 to 95 weight percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Other useful emulsifiers include such materials as polyethoxylated vegetable oils. Although the use of an emulsifier is desirable to influence the type of foam structure that is formed, the rigid polyurethane foam starting materials can be prepared without emulsifiers in some cases.

The finely divided carbonaceous filler is introduced into the polyester-type foam formulation before the latter is foamed. Preferably the filler is added to the aforesaid polyesters and homogeneously dispersed therethrough.

In a particularly preferred mode of operation the finely divided carbonaceous materials which constitute the filler are dispersed in a liquid vehicle or carrier. The vehicle must be a carbonizable liquid and must not be soluble in the polyurethane system, however. The weight ratio of the vehicle to the filler preferably can be as high as about 3:1 and as low as about 1:1. Most preferred is a weight ratio of the vehicle to the filler of about 2:1. Typical illustrative vehicles are liquid furan resins, such as furfural and furfural alcohol, liquid urea resins, liquid epoxy resins, liquid phenolic resins, and the like. Particularly suitable has been found a mixture of 25% by weight furfuryl, 25% by weight furfural alcohol, and 50% by weight phenol-formaldehyde resin.

The amount of filler in the polyurethane foam can be as low as about 5 weight percent and as high as about 15 weight percent. Filler in an amount of about 10 percent by weight is preferred, particularly when added as a 2:1 admixture of vehicle and filler, respectively. The admixture is added, of course, in an amount of about 30 percent by weight of the foam system.

The filler can have an average particle size up to about that passing through a 200 mesh screen. The choice of particle size in a given instance is governed by the density of the foam formulation and also the density of the filler. The particle size of the filler must be such that it will not settle out of the foam formulation once admixed therewith but will remain in suspension until such time when the polyurethane foam is set. Furthermore, the filler particles, like the vehicle, must be insoluble in the polyurethane foam system.

Carbonaceous materials that are suitable for use as fillers for the purposes of the present invention are graphite flour, graphitized petroleum coke flour, thermatomic carbon black, pulverized pitch, sugars, solid synthetic resins which are not soluble in the filler vehicle, and the like. Mixtures of the aforementioned fillers can also be employed. A particularly suitable filler is a mixture of graphite flour and thermatomic carbon black in a weight ratio of about 4:1, respectively.

The carbon foams prepared in the aforedescribed manner have a flexural strength about twice that of carbonized polyurethane foams containing no fillers. As is readily apparent from a comparison of FIGS. 1 and 2, carbon foams having about the same density (20 pounds per cubic foot and 18.2 pounds per cubic foot, respectively) differ in pore size, wall thickness, and general appearance. The average pore diameter of the filler-modified carbon foam was found to be about three times that of the unmodified carbon foam derived from a rigid, polyester-type polyurethane foam. In addition, the wall thickness for the filler-modified foam was found to be at least about 1.8 times that of the unmodified carbon foam.

Referring specifically to FIGS. 1 and 2, P denotes a pore in the foam structure and W denotes a wall section. In addition, in FIG. 2 rough-textured wall areas are denoted by (R) and smooth-textured wall areas are denoted by (S).

Measurements made of the physical dimensions of the pores in the above-described carbon foam samples are compiled in Table I below.

TABLE I

| Polyurethane-Derived Carbon Foam | Bulk Density, lbs./ft.³ | Volume, Percent | | Average Thickness, mm. | | Thickness ratio, pore/wall |
| --- | --- | --- | --- | --- | --- | --- |
| | | Wall | Pore | Wall | Pore | |
| Unmodified | 20 | 29.4 | 70.6 | 0.030 | 0.071 | 2.37 |
| Filler-modified | 18.2 | 20.2 | 79.8 | 0.053 | 0.210 | 3.96 |

The physical properties of polyurethane-derived carbon foams of varying densities are compiled in Table II below.

TABLE II

| Polyurethane-Derived Carbon Foam | Bulk Density, lbs./ft.³ | Percent Porosity Carbon | Permeability, darcys |
| --- | --- | --- | --- |
| Unmodified | 9.6 | 89.4 | 26.5 |
| Do | 26.9 | 72.6 | 11.6 |
| Filler-modified | 15.9 | 85.4 | 22.5 |
| Do | 24.4 | 75.5 | 28.9 |

The above data indicate that whereas the permeability decreases with increasing density in the case of an unmodified polyurethane-derived carbon foam, the contrary is true for a filler-modified carbon foam of the present invention.

The measure of permeability is the darcy. A porous medium has a permeability of one darcy if it will pass through a cross-section of one square centimeter a fluid having a viscosity of one centipoise at a rate of one cubic centimeter per second under the action of a pressure gradient of one atmosphere per centimeter.

The present invention is further illustrated by the following example.

EXAMPLE I

To about 24.5 parts by weight saturated polyester resin (the ethylene glycol-adipic acid type) were added 30 parts by weight a finely-divided carbonaceous filler suspended in a vehicle. The filler comprised about 12 parts by weight graphite flour and about 3 parts by weight thermatomic carbon black. The vehicle comprised about 3.75 parts by weight furfural, about 3.75 parts by weight furfural alcohol, and about 7.5 parts by weight phenol-formaldehyde resin.

The resulting mass was stirred until homogeneous and was combined, while stirred, with about 42 parts by weight polymethylene polyphenylisocyanate and about 3.5 parts by weight a mixture containing about 40% by weight water, about 20% by weight N-methylmorpholine, and about 40% by weight a blend of hydroxyl-terminated polyesters and oil-soluble sulfonates. Stirring was discontinued about 1.5 minutes after the addition was completed.

The resultant mass was then poured into a mold and placed in an oven at about 60° C. The mass began to foam and a rigid polyester-type polyurethane foam was produced in about 30 minutes. The resulting foam was cut into slabs (12" x 8" x 3") and cured at about 200° C. for about 15 hours, thereafter oxidized by heating in air at about 250° C. for about 20 hours. The foam was then cooled, placed in a double, charcoal-sealed sagger and heated to a pyrolying temperature of about 750° C. at a rate of about 5–10° C. per hour. As a result, a strong carbon foam slab was obtained.

A portion of the resulting carbon foam was then graphitized in an inert atmosphere by heating to about 2800° C.

Graphitized filler-modified foam prepared in the hereinabove described manner was observed to have shrunk about 45 percent during the process. This compares favorably with about 60 percent shrinkage observed for an unmodified polyester-type polyurethane foam when subjected to a similar treatment.

The foregoing discussion is intended as illustrative. Other variations and modifications within the spirit and scope of this invention will readily present themselves to one skilled in the art.

We claim:

1. Method for producing a relatively high strength carbon foam which comprises incorporating into a rigid polyester-type polyurethane foam during its manufacture a finely-divided carbonaceous filler; maintaining the resulting foam for a predetermined time period sufficient to increase the degree of cross-linking of the polymers therein at an elevated temperature up to about 200° C. and in an oxygen-containing atmosphere; thereafter maintaining said resulting foam in an oxygen-containing atmosphere at a temperature in the range from about 200° C. to about 255° C. until said resulting foam sustains a weight loss of at least about 3.5 percent; and maintaining the resulting foam at a temperature in the range from about 500° C. to about 1000° C. and in an oxygen-free atmosphere for a sufficient time period to produce a carbon foam.

2. Method for producing a relatively high strength carbon foam which comprises incorporating into a rigid polyester-type polyurethane foam during its manufacture from about 5 to about 15 percent by weight of the foam a finely-divided carbonaceous filler; maintaining the resulting foam for a predetermined time period sufficient to increase the degree of cross-linking of the polymers therein at an elevated temperature up to about 200° C. and in an oxygen-containing atmosphere; thereafter maintaining said resulting foam in an oxygen-containing atmosphere at a temperature in the range from about 200° C. to about 255° C. until said resulting foam sustains a weight loss of at least about 3.5 percent; and maintaining the resulting foam at a temperature in the range from about 500° C. to about 1000° C. and in an oxygen-free atmosphere for a sufficient time period to produce a carbon foam.

3. Method for producing a relatively high strength carbon foam which comprises incorporating into a rigid, polyester-type polyurethane foam during its manufacture from about 5 to about 15 percent by weight of the foam a finely-divided carbonaceous filler suspended in a carbonizable vehicle which is insoluble in the polyurethane foam system, maintaining the resulting foam for a predetermined time period sufficient to increase the degree of cross-linking of the polymers therein at an elevated temperature up to about 200° C. and in an oxygen-containing atmosphere; thereafter maintaining said resulting foam in an oxygen-containing atmosphere at a temperature in the range from about 200° C. to about 255° C. until said resulting foam sustains a weight loss of at least about 3.5 percent; and maintaining the resulting foam at a temperature in the range from about 500° C. to about 1000° C. and in an oxygen-free atmosphere for a sufficient time period to produce a carbon foam.

4. Method for producing a relatively high strength carbon foam which comprises incorporating into a rigid, polyester-type polyurethane foam during its manufacture from about 5 to about 15 percent by weight of the foam a finely-divided carbonaceous filler suspended in a carbonizable vehicle which is insoluble in the polyurethane foam system and which is present in a weight ratio to the filler of from about 3:1 to about 1:1; maintaining the resulting foam for a predetermined time period sufficient to increase the degree of cross-linking of the polymers therein at an elevated temperature up to about 200° C. and in an oxygen-containing atmosphere; thereafter maintaining said resulting foam in an oxygen-containing atmosphere at a temperature in the range from about 200° C. to about 255° C. until said resulting foam sustains a weight loss of at least about 3.5 percent; and maintaining the resulting foam at a temperature in the range from about 500° C. to about 1000° C. and in an oxygen-free atmosphere for a sufficient time period to produce a carbon foam.

5. Method for producing a relatively high strength carbon foam which comprises incorporating into a rigid, polyester-type polyurethane foam during its manufacture about 10 percent by weight of the foam a finely-divided carbonaceous filler suspended in a carbonizable vehicle which is insoluble in the polyurethane foam system and which is present in a weight ratio to the filler of about 2:1; maintaining the resulting foam for a predetermined time period sufficient to increase the degree of cross-linking of the polymers therein at an elevated temperature up to about 200° C. and in an oxygen-containing atmosphere; thereafter maintaining said resulting foam in an oxygen-containing atmosphere at a temperature in the range from about 200° C. to about 255° C. until said resulting foam sustains a weight loss of at least about 3.5 percent; and maintaining the resulting foam at a temperature in the range from about 500° C. to about 1000° C. and in an oxygen-free atmosphere for a sufficient time period to produce a carbon foam.

6. Method for producing a relatively high strength carbon foam which comprises incorporating into a rigid, polyester-type polyurethane foam during its manufacture from about 5 to about 15 percent by weight a mixture of graphite flour and thermatomic carbon black suspended in a carbonizable vehicle which is insoluble in the polyurethane foam system and which is present in a weight ratio to said mixture of graphite flour and thermatomic carbon black of from about 3:1 to about 1:1; maintaining the resulting foam for a predetermined time period sufficient to increase the degree of cross-linking of the polymers therein at an elevated temperature up to about 200° C. and in an oxygen-containing atmosphere; thereafter maintaining said resulting foam in an oxygen-containing atmosphere at a temperature in the range from about 200° C. to about 255° C. until said resulting foam sustains a weight loss of at least about 3.5 percent; and maintaining the resulting foam at a temperature in the range from about 500° C. to about 1000° C. and in an oxygen-free atmosphere for a sufficient time period to produce a carbon foam.

7. Method for producing a relatively high strength carbon foam which comprises incorporating into a rigid, polyester-type foam during its manufacture about 10 percent by weight of the foam a 4:1 weight ratio mixture of graphite flour and thermatomic carbon black suspended in about 20 percent by weight of the foam a mixture of furfural, furfural alcohol, and phenolformaldehyde resin; maintaining the resulting foam for a predetermined time period sufficient to increase the degree of cross-linking of the polymers therein at an elevated temperature up to about 200° C. and in an oxygen-containing atmosphere; thereafter maintaining said resulting foam in an oxygen-containing atmosphere at a temperature in the range from about 200° C. to about 255° C. until said resulting foam sustains a weight loss of at least about 3.5 percent; and maintaining the resulting foam at a temperature in the range from about 500° C. to about 1000° C. and in an oxygen-free atmosphere for a sufficient time period to produce a carbon foam.

8. A method for producing a relatively high-strength carbon foam which comprises admixing a polyester resin with a suspension of finely divided carbonaceous particles in a carbonizable vehicle, reacting the polyester with an organic polyisocyanate to form a rigid polyester-type polyurethane foam, maintaining said foam for a time period sufficient to increase the degree of cross-linking of the polymers therein at a temperature in the range from about 150° C. to about 200° C. and in an oxygen-containing atmosphere; thereafter maintaining said polyurethane foam in an oxygen-containing atmosphere at a temperature in the range from about 220° C. to about 240° C. until said polyurethane foam sustains a weight loss of about 5 to about 40 weight percent; and maintaining the resulting foam at a temperature in the range from about 500° C. to about 1000° C. and in an oxygen-free atmosphere for a sufficient time period to produce a carbon foam.

9. The method of claim 8 wherein the resulting foam is subsequently graphitized in an oxygen-free atmosphere at a temperature above about 2200° C.

10. A method for producing a relatively high strength carbon foam which comprises admixing a polyester resin with a suspension of finely divided carbonaceous particles in a carbonizable vehicle; reacting the polyester with an organic polyisocyanate to form a rigid polyester-type polyurethane foam; maintaining said foam in an oxygen-containing atmosphere at a temperature in the range from about 150° C. to about 200° C. for a time period sufficient to increase the degree of cross-linking of the polymers therein; thereafter maintaining said polyurethane foam in an oxygen containing atmosphere in the range from about 220° C. to about 240° C. until said polyurethane foam sustains a weight loss of about 5 to about 40 weight percent; pyrolyzing the resulting foam in an oxygen-free atmosphere at incandescense for a sufficient time period to produce a carbon foam; and graphitizing said carbon foam in an oxygen-free atmosphere at a temperature in the range from about 2800° C. to about 3000° C.

11. A high-strength, polyurethane-derived carbon foam produced in accordance with the method of claim 1.

References Cited

UNITED STATES PATENTS

| | | | |
|---|---|---|---|
| 3,121,050 | 2/1964 | Ford | 23—209.4 |
| 2,917,384 | 12/1959 | Grandey | 260—2.5 X |
| 3,111,396 | 6/1963 | Ball | 264—44 |

FOREIGN PATENTS 643,007  6/1962  Canada.

ROBERT F. WHITE, *Primary Examiner.*

A. R. NOE, J. A. FINLAYSON, *Assistant Examiners.*